US011149324B2

(12) United States Patent
Matsumoto et al.

(10) Patent No.: US 11,149,324 B2
(45) Date of Patent: Oct. 19, 2021

(54) HIGH STRENGTH AUSTENITIC STAINLESS STEEL HAVING EXCELLENT RESISTANCE TO HYDROGEN EMBRITTLEMENT, METHOD FOR MANUFACTURING THE SAME, AND HYDROGEN EQUIPMENT USED FOR HIGH-PRESSURE HYDROGEN GAS AND LIQUID HYDROGEN ENVIRONMENT

(71) Applicant: Nippon Steel & Sumikin Stainless Steel Corporation, Tokyo (JP)

(72) Inventors: Kazuhisa Matsumoto, Hikari (JP); Masaharu Hatano, Hikari (JP)

(73) Assignee: NIPPON STEEL STAINLESS STEEL CORPORATION, Tokyo (JP)

( * ) Notice: Subject to any disclaimer, the term of this patent is extended or adjusted under 35 U.S.C. 154(b) by 1056 days.

(21) Appl. No.: 15/078,562

(22) Filed: Mar. 23, 2016

(65) Prior Publication Data

US 2016/0281187 A1    Sep. 29, 2016

(30) Foreign Application Priority Data

Mar. 26, 2015 (JP) .............................. JP2015-064951
Mar. 22, 2016 (JP) .............................. JP2016-057076

(51) Int. Cl.
| | | |
|---|---|---|
| *C21D 9/00* | (2006.01) | |
| *C22C 38/50* | (2006.01) | |
| *C22C 38/48* | (2006.01) | |
| *C22C 38/46* | (2006.01) | |
| *C22C 38/44* | (2006.01) | |
| *C22C 38/06* | (2006.01) | |
| *C22C 38/04* | (2006.01) | |
| *C22C 38/02* | (2006.01) | |
| *C22C 38/00* | (2006.01) | |
| *C21D 8/00* | (2006.01) | |
| *C22C 38/54* | (2006.01) | |
| *C22C 38/42* | (2006.01) | |
| *F17C 1/10* | (2006.01) | |
| *F17C 1/14* | (2006.01) | |

(52) U.S. Cl.
CPC .......... *C21D 9/0068* (2013.01); *C21D 8/005* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *F17C 1/10* (2013.01); *F17C 1/14* (2013.01); *F17C 2203/0643* (2013.01); *F17C 2203/0648* (2013.01); *F17C 2221/012* (2013.01); *F17C 2223/0123* (2013.01); *F17C 2223/036* (2013.01); *F17C 2260/011* (2013.01); *F17C 2260/053* (2013.01)

(58) Field of Classification Search
None
See application file for complete search history.

(56) References Cited

U.S. PATENT DOCUMENTS

| | | | |
|---|---|---|---|
| 2002/0102178 A1 | 8/2002 | Hiramatsu et al. | |
| 2003/0021716 A1 | 1/2003 | Hauser et al. | |
| 2004/0234408 A1* | 11/2004 | Semba .................. | C22C 19/055 420/49 |
| 2006/0193743 A1 | 8/2006 | Semba et al. | |
| 2008/0089803 A1* | 4/2008 | Okada ................... | F28F 21/083 420/38 |
| 2009/0159602 A1 | 6/2009 | Hatano et al. | |
| 2012/0018054 A1* | 1/2012 | Lee ....................... | C21D 6/004 148/505 |
| 2012/0222781 A1 | 9/2012 | Azuma et al. | |
| 2013/0174949 A1 | 7/2013 | Hatano et al. | |
| 2014/0017111 A1* | 1/2014 | Omura ................... | C22C 38/58 420/40 |
| 2015/0010425 A1* | 1/2015 | Osuki .................... | C22C 38/06 420/54 |
| 2017/0167005 A1* | 6/2017 | Ishizaki ................. | C22C 38/04 |

FOREIGN PATENT DOCUMENTS

| | | |
|---|---|---|
| CN | 102639739 A | 8/2012 |
| EP | 1605073 A1 | 12/2005 |
| EP | 1645649 A1 | 4/2006 |

(Continued)

OTHER PUBLICATIONS

Fukuyama et al., "Effect of Temperature on Hydrogen Environment Embrittlement of Type 316 Series Austenitic Stainless Steels at Low temperatures", Journal of the Japan Institute of Metals and Materials, vol. 67, No. 9, 2003, pp. 456-459.

(Continued)

*Primary Examiner* — Nicholas A Wang
*Assistant Examiner* — Anthony M Liang
(74) *Attorney, Agent, or Firm* — Birch, Stewart, Kolasch & Birch, LLP

(57) ABSTRACT

This high strength austenitic stainless steel having excellent resistance to hydrogen embrittlement includes, in terms of mass %, C: 0.2% or less, Si: 0.2% to 1.5%, Mn: 0.5% to 2.5%, P: 0.06% or less, S: 0.008% or less, Ni: 10.0% to 20.0%, Cr: 16.0% to 25.0%, Mo: 3.5% or less, Cu: 3.5% or less, N: 0.01% to 0.50%; and O: 0.015% or less, with the balance being Fe and unavoidable impurities, in which an average size of precipitates is 100 nm or less and an amount of the precipitates is 0.001% to 1.0% in terms of mass %.

10 Claims, No Drawings

(56) References Cited

FOREIGN PATENT DOCUMENTS

| | | |
|---|---|---|
| EP | 1944385 A1 | 7/2008 |
| EP | 2460904 A2 | 6/2012 |
| EP | 2623624 A1 | 8/2013 |
| EP | 2692886 A1 | 2/2014 |
| GB | 995068 A | 6/1965 |
| JP | 62-80221 A | 4/1987 |
| JP | 7-70701 A | 3/1995 |
| JP | 2002-173742 A | 6/2002 |
| JP | 2002-371339 A | 12/2002 |
| JP | 2003-89855 A | 3/2003 |
| JP | 2004-323937 A | 11/2004 |
| JP | 2005-154890 A | 6/2005 |
| JP | 2007-126688 A | 5/2007 |
| JP | 2009-133001 A | 6/2009 |
| JP | 2011-26650 A | 2/2011 |
| JP | 2011026650 A * | 2/2011 |
| JP | 5131794 B2 | 1/2013 |
| JP | 2014-1422 A | 1/2014 |
| JP | 2014-47409 A | 3/2014 |
| KR | 10-2011-0004491 A | 1/2011 |
| KR | 10-2013-0045931 A | 5/2013 |
| KR | 10-2013-0121981 A | 11/2013 |
| WO | WO 2004/083477 A1 | 9/2004 |
| WO | WO 2004/111285 A1 | 12/2004 |
| WO | WO 2012/132992 A1 | 10/2012 |

OTHER PUBLICATIONS

Japanese Office Action for Japanese Application No. 2016-057076, dated Oct. 1, 2019, with an English translation.
Chinese Office Action and Search Report, dated Jul. 4, 2018 for Chinese Application No. 201680012710.3, with a partial English translation of the Chinese Search Report.
English translation of International Search Report (form PCT/ISA/210), dated May 17, 2016 corresponding for International Application No. PCT/JP2016/054900.
Extended European Search Report for European Application No. 16761458.5 dated Nov. 22, 2018.
Korean Notice of Allowance, dated Jan. 4, 2019, for Korean Application No. 10-2017-7023655, with an English translation.
Written Opinion of the International Searching Authority (form PCT/ISA/237), dated May 17, 2016 for International Application No. PCT/JP2016/054900, with an English translation.

* cited by examiner

HIGH STRENGTH AUSTENITIC STAINLESS STEEL HAVING EXCELLENT RESISTANCE TO HYDROGEN EMBRITTLEMENT, METHOD FOR MANUFACTURING THE SAME, AND HYDROGEN EQUIPMENT USED FOR HIGH-PRESSURE HYDROGEN GAS AND LIQUID HYDROGEN ENVIRONMENT

TECHNICAL FIELD

The present invention relates to a high strength austenitic stainless steel having excellent resistance to hydrogen embrittlement, a method for manufacturing the same, and a hydrogen equipment (application) used for (in) a high-pressure hydrogen gas and liquid hydrogen environment; and in particular, the present invention relates to a high strength austenitic stainless steel which is used for (in) a high-pressure hydrogen gas and liquid hydrogen environment and has excellent resistance to hydrogen embrittlement, and a method for manufacturing the same.

The present application claims priority on Japanese Patent Application No. 2015-064951 filed on Mar. 26, 2015 and Japanese Patent Application No. 2016-057076 filed on Mar. 22, 2016, the contents of which are incorporated herein by reference.

BACKGROUND ART

In recent years, from a viewpoint of prevention of global warming, a technology which utilizes hydrogen as a medium for transporting or storing energy has been developed in order to suppress the emission of greenhouse gases ($CO_2$, $NO_x$, and $SO_x$). Thus, development of a metal material used for devices for transporting or storing hydrogen is expected.

In the related art, a hydrogen gas having a pressure of about 40 MPa or lower as a high pressure gas is filled and stored in a gas cylinder made of thick (thickness is large) Cr—Mo steel. In addition, as a piping material or a high-pressure hydrogen gas tank liner of a fuel-cell vehicle, a SUS316 type austenitic stainless steel (hereinafter, referred to as "SUS316 steel") of the Japanese Industrial Standards is used. The resistance to hydrogen embrittlement of the SUS316 steel in a high-pressure hydrogen gas environment is more satisfactory than that of, for example, a carbon steel including the aforementioned Cr—Mo steel or SUS304 type austenitic stainless steel (hereinafter, referred to as "SUS304 steel") of the Japanese Industrial Standards.

In recent years, prior to general sales of fuel-cell vehicles, an official trial production and a demonstration experiment of a hydrogen station have been proceeded. For example, a hydrogen station is in the validation phase, and in the hydrogen station, a large amount of hydrogen can be stored as liquid hydrogen and the pressure of the liquid hydrogen is increased to 70 MPa or higher to be supplied as a high-pressure hydrogen gas. In addition, in the hydrogen station, a technology which is referred to as "precooling" has been put to practical use, and the technology "precooling" precools hydrogen which is filled in a tank of the fuel-cell vehicle to a low temperature of about −40° C.

From the above-described matters, it is assumed that a metal material used for a storage container for liquid hydrogen attached to a dispenser of the hydrogen station, a hydrogen gas piping, and the like is exposed to a hydrogen gas having a high pressure of 70 MPa and a low temperature.

As a metal material in which hydrogen embrittlement does not occur in an environment where hydrogen embrittlement occurs more severely, the SUS316 steel and SUS316L steel containing about 13% of Ni can be exemplified. Use of these two types of steels in a 70 MPa-class hydrogen station in Japan is recognized in the exemplified standards determined by the High Pressure Gas Safety Institute of Japan.

Meanwhile, in order to construct and autonomously develop a hydrogen energy society where fuel-cell vehicles play leading rolls, it is essential to reduce the costs of fuel-cell vehicles and hydrogen stations. That is, with regard to the metal material used for a hydrogen embrittlement environment, in order to reduce the amount of the steel material used, the size and thickness of various devices are reduced and the strength of the metal material is required to be further increased. In particular, a tensile strength of about 650 MPa is required for the metal material used for a high-pressure hydrogen piping.

However, the SUS316 type austenitic stainless steel described in the aforementioned exemplified standards is expensive since the SUS316 type austenitic stainless steel includes a large amounts of Ni and Mo, which are rare metals. However, even in the case where the SUS316 type austenitic stainless steel is subjected to a solution treatment, the SUS316 type austenitic stainless steel does not satisfy the above-described tensile strength. Thus, the SUS316 type austenitic stainless steel is subjected to cold working to reinforce the strength, and then the SUS316 type austenitic stainless steel is used.

As the steel materials obtained by increasing the tensile strengths of the SUS316 steel and the SUS316L steel, the SUS316N and SUS316LN of Japanese Industrial Standards steel types are known, and in these steel types, solid solution strengthening due to N is utilized. However, for example, as reported in Non-Patent Document, ductilities of the SUS316N and the SUS316LN are decreased in a high-pressure hydrogen gas at a low temperature.

With regard to a stainless steel disclosed in Patent Document 1 (Japanese Unexamined Patent Application, First Publication No. 2002-173742), the amount of Ni is set to be 4% to 12%, and a thermomechanical treatment is conducted. Thereby, the metallographic structure (microstructure) is controlled to be a dual-phase microstructure of an austenite phase and a martensite phase. As a result, a remarkably hard stainless steel having a Vickers hardness of about 500 is achieved.

With regard to a stainless steel disclosed in Patent Document 2 (Japanese Unexamined Patent Application, First Publication No. 2009-133001), resistance to hydrogen embrittlement is enhanced by utilizing carbonitrides of Ti and Nb having sizes of 1 μm or more, and the stainless steel is economically excellent since Mo is not added in contrast to the SUS316 steel.

However, since the stainless steel disclosed in Patent Document 1 includes a martensite phase in which hydrogen embrittlement easily occurs, it is difficult to use this stainless steel in a hydrogen environment.

In addition, the strength of the stainless steel disclosed in Patent Document 2 is in the same range of the strength of SUS316 steel, and it is desired that the strength thereof is further enhanced.

As such, currently, a high strength austenitic stainless steel having resistance to hydrogen embrittlement in a low temperature and high-pressure hydrogen gas environment having a pressure of higher than 40 MPa has not been appeared yet.

PRIOR ART DOCUMENTS

Patent Documents

Patent Document 1: Japanese Unexamined Patent Application, First Publication No. 2002-173742
Patent Document 2: Japanese Unexamined Patent Application, First Publication No. 2009-133001

Patent Document 3: Japanese Unexamined Patent Application, First Publication No. 2014-47409

Patent Document 4: Japanese Unexamined Patent Application, First Publication No. 2014-1422

Non-Patent Document

Non-Patent Document 1: "Effect of Temperature on Hydrogen Environment Embrittlement of Type 316 Series Austenitic Stainless Steels at Low temperatures", Journal of the Japan Institute of Metals and Materials, Vol. 67, No. 9, pp. 456 to 459

SUMMARY OF THE INVENTION

The present invention has been made in consideration of the aforementioned circumstances, and the present invention aims to provide a high strength austenitic stainless steel having excellent resistance to hydrogen embrittlement, which can be appropriately used in a low temperature and high-pressure hydrogen gas environment having a pressure of higher than 40 MPa.

For example, Patent Document 3 (Japanese Unexamined Patent Application, First Publication No. 2014-47409) discloses a stainless steel for high-pressure hydrogen aiming for increasing the strength by precipitation strengthening.

The stainless steel disclosed in Patent Document 3 utilizes η phase intermetallic compounds. However, it is necessary to add 20% or more of Ni and this causes an increase in alloy cost.

Therefore, the present inventors paid attention to Cr-based carbonitrides as precipitates obtainable by utilizing major elements.

Meanwhile, in general, various properties of the stainless steel are degraded by the influence of the Cr-based carbonitrides. For example, as disclosed in Patent Document 4 (Japanese Unexamined Patent Application, First Publication No. 2014-1422), in the case where the Cr-based carbonitrides are precipitated, an interface between the Cr-based carbonitride and a matrix phase becomes a starting point of fracture, and this causes degradation of formability.

Further, the influence of the Cr-based carbonitrides on the resistance to hydrogen embrittlement of the stainless steel is not exceptional. According to Non-Patent Document 1, in the case where the Cr-based carbonitrides are precipitated in the metallographic structure (microstructure), a Cr-depletion layer in which the Cr concentration is remarkably decreased is formed in the surroundings of this precipitate. Since the stability of the austenite phase is decreased in the vicinity of this Cr-depletion layer, a deformation-induced martensite phase is generated preferentially at the time of deformation, and this causes degradation in ductility in the high-pressure hydrogen gas. It is possible to cause the Cr depletion layer to be disappeared by additionally performing a heat treatment to diffuse Cr, but doing so increases the manufacturing cost.

The present inventors have thoroughly studied the relationship between an alloy component composition of the austenitic stainless steel including Cr, Ni, and Mo, which are major elements, and trace elements, and a microstructure, the average size of the precipitates, resistance to hydrogen embrittlement in a high-pressure hydrogen gas environment, and the strength characteristics. As a result, the following new findings (a) to (f) are obtained.

(a) In the specimen where hydrogen embrittlement has occurred, cracks are generated in the surroundings of Cr-based carbonitrides and intermetallic compounds of Ni, Fe, Cr, Mo, and Si. As the cracks generated in the surroundings of these precipitates are linked to each other and propagated, the ductility is decreased.

(b) However, by controlling the size of the precipitate to be 100 nm or less and controlling the amount thereof to be 1.0% or less in terms of mass %, the generation and the development of the cracks which are generated by hydrogen embrittlement are remarkably suppressed, and as a result, resistance to hydrogen embrittlement is enhanced.

(c) By controlling the average size of the precipitates to be 100 nm or less and controlling the amount of the precipitates to be 0.001% to 1.0% in terms of mass %, the precipitates such as Cr-based carbonitrides, intermetallic compounds of Ni, Fe, Cr, Mo, and Si, and Ti, Nb, and V-based carbonitrides act effectively on increasing the strength of the austenitic stainless steel. Further, it is possible to obtain a tensile strength of about 650 MPa, which is equal to or higher than that of the cold-worked material of SUS316 steel, by utilizing solid solution strengthening due to N and acting and combining precipitation strengthening therewith.

(d) The size of the precipitate is greatly affected by heat treatment conditions. The precipitation nose of the Cr-based carbonitrides and the intermetallic compounds of Ni, Fe, Cr, Mo, and Si is about 800° C., and in the case where a steel material is retained at a temperature of higher than 800° C., the precipitates are generated within a short period of time, and the precipitates are rapidly coarsened. Thus, it is difficult to control the average size of the precipitates to be 100 nm or less. In the case where a steel material is retained at a temperature of 800° C. or lower, the coarsening of the precipitates can be suppressed but it takes time to start the precipitation.

(e) At the time of cooling after the final heat treatment, by controlling the average cooling rate to be less than 2.0° C./s until a temperature reaches 750° C., it is possible to secure the size and the amount in terms of mass % of the precipitates which attain both of the increase in strength of the stainless and the enhancement of the resistance to hydrogen embrittlement.

(f) In addition, by adding one or more Ti, Nb, and V which easily form carbonitrides to the steel material in a trace amount to precipitate the Ti, Nb, and V-based carbonitrides, or by adding Cu to precipitate Cu, it is possible to further increase the strength without impairing resistance to hydrogen embrittlement.

The present invention has been made based on the aforementioned new findings (a) to (f) and the features thereof are as follows.

(1) A high strength austenitic stainless steel having excellent resistance to hydrogen embrittlement includes, in terms of mass %, C: 0.2% or less, Si: 0.2% to 1.5%, Mn: 0.5% to 2.5%, P: 0.06% or less, S: 0.008% or less, Ni: 10.0% to 20.0%, Cr: 16.0% to 25.0%, Mo: 3.5% or less, Cu: 3.5% or less, N: 0.01% to 0.50%, and O: 0.015% or less, with the balance being Fe and unavoidable impurities, in which an average size of precipitates is 100 nm or less and an amount of the precipitates is 0.001% to 1.0% in terms of mass %.

(2) The high strength austenitic stainless steel having excellent resistance to hydrogen embrittlement according to (1), further includes one or more selected from the group consisting of, in terms of mass %, Al: 0.3% or less, Mg: 0.01% or less, Ca: 0.01% or less, REM: 0.10% or less, and B: 0.008% or less.

(3) The high strength austenitic stainless steel having excellent resistance to hydrogen embrittlement according to (1) or (2), further includes one or more selected from the group consisting of, in terms of mass %, Ti: 0.5% or less, Nb: 0.5% or less, and V: 0.5% or less.

(4) The high strength austenitic stainless steel having excellent resistance to hydrogen embrittlement according to any one of (1) to (3) is used for a high-pressure hydrogen gas and liquid hydrogen environment.

(5) A method for manufacturing a high strength austenitic stainless steel having excellent resistance to hydrogen embrittlement, the method includes: subjecting a semi-finished product having a component composition according to any one of (1) to (3) to hot working; performing a final heat treatment at a temperature of 1000° C. to 1200° C.; and performing cooling after the final heat treatment, in which, in the cooling, an average cooling rate until a temperature reaches 750° C. is controlled to be less than 2.0° C./s.

(6) A hydrogen equipment used for a high-pressure hydrogen gas and liquid hydrogen environment, in which the high strength austenitic stainless steel having excellent resistance to hydrogen embrittlement according to any one of (1) to (4) is used.

Effects of the Invention

According to one aspect of the present invention, it is possible to provide a high strength austenitic stainless steel which has excellent resistance to hydrogen embrittlement and is appropriately used in a high-pressure hydrogen gas and liquid hydrogen environment, and a method for manufacturing the same.

EMBODIMENTS FOR CARRYING OUT THE INVENTION

Hereinafter, the austenitic stainless steel and the method for manufacturing thereof according to the embodiment will be described in detail.

First, the component composition of the austenitic stainless steel according to the embodiment will be described. In addition, in the following description, the "%" indicating the amount of each element means "mass %".

The austenitic stainless steel according to the embodiment includes, in terms of mass %, C: 0.2% or less, Si: 0.2% to 1.5%, Mn: 0.5% to 2.5%, P: 0.06% or less, S: 0.008% or less, Ni: 10.0% to 20.0%, Cr: 16.0% to 25.0%, Mo: 3.5% or less, Cu: 3.5% or less, N: 0.01% to 0.50%, and O: 0.015% or less. Further, the average size of the precipitates is 100 nm or less, and the amount of the precipitates is 0.001% to 1.0% in terms of mass %.

<C: 0.2% or Less>

C is an element effective for stabilizing an austenite phase and C contributes to enhancing resistance to hydrogen embrittlement. In addition, C also contributes to an increase in strength due to solid solution strengthening and precipitation strengthening due to Cr-based carbides. In order to obtain these effects, it is preferable to set the amount of C to be 0.01% or more. Meanwhile, an excessive amount of C causes precipitation of an excessive amount of Cr-based carbides and this leads to degradation of resistance to hydrogen embrittlement. Therefore, it is necessary to set the upper limit of the amount of C to be 0.2%. The upper limit of the amount of C is more preferably 0.15%.

<Si: 0.2% to 1.5%>

Si is an element effective for stabilizing the austenite phase. It is necessary to set the amount of Si to be 0.2% or more in order to enhance resistance to hydrogen embrittlement by stabilizing the austenite phase. The amount of Si is preferably 0.4% or more. Meanwhile, an excessive amount of Si promotes generation of intermetallic compounds such as a sigma phase and the like and this causes degradation of hot workability and toughness. Therefore, it is necessary to set the upper limit of the amount of Si to be 1.5%. The amount of Si is more preferably 1.1% or less.

<Mn: 0.5% to 2.5%>

Mn is an element effective for stabilizing the austenite phase. The stabilization of the austenite phase suppresses generation of deformation-induced martensite phase; and thereby, resistance to hydrogen embrittlement is enhanced. Therefore, it is necessary to set the amount of Mn to be 0.5% or more. The amount of Mn is preferably 0.8% or more. Meanwhile, an excessive amount of Mn promotes generation of coarse MnS inclusions and this causes degradation in ductility of the austenite phase. In addition, an excessive amount of Mn also has an action of promoting generation of nitrides. Therefore, it is necessary to set the upper limit to be 2.5%. The amount of Mn is more preferably 2.0% or less.

<P: 0.06% or Less>

P is included as an impurity in the austenitic stainless steel of the embodiment. Since P is an element degrading hot workability, it is preferable to reduce the amount of P as much as possible. Specifically, it is preferable to limit the amount of P to be 0.06% or less and is more preferable to limit the amount thereof to be 0.05% or less. However, since an extreme reduction in the amount of P leads to an increase in the production cost of the steel, the amount of P is preferably 0.008% or more.

<S: 0.008% or Less>

S is an element which is segregated in austenite grain boundaries at the time of hot working and S weakens the bonding strength of the grain boundary. Thereby, S induces cracks at the time of hot working. Therefore, it is necessary to limit the upper limit of the amount of S to be 0.008%. The upper limit of the amount of S is preferably 0.005%. Since it is preferable to reduce the amount of S as much as possible, the lower limit is not particularly provided; however, an extreme reduction in the amount of S leads to an increase in the production cost of the steel. Therefore, the amount of S is preferably 0.0001% or more.

<Ni: 10.0% to 20.0%>

Ni is an element which is very effective for enhancing resistance to hydrogen embrittlement of the austenitic stainless steel. In addition, Ni promotes generation of intermetallic compounds of Ni, Fe, Cr, Mo, and Si and Ni contributes to increasing the strength. In order to obtain these effects, it is necessary to set the amount of Ni to be 10.0% or more. Since these effects are further enhanced by homogenizing the component segregation, the amount of Ni is preferably 11.5% or more. Meanwhile, since an excessive amount of Ni causes an increase in material cost, the upper limit of the amount of Ni is set to be 20.0%. The amount of Ni is preferably 14.0% or less.

<Cr: 16.0% to 25.0%>

Cr is an indispensable element for obtaining corrosion resistance required for a stainless steel. In addition, Cr is an element contributing to an increase in strength of the austenitic stainless steel. In order to obtain these effects, it is necessary to set the amount of Cr to be 16.0% or more. The amount of Cr is preferably 16.5% or more. Meanwhile, an excessive amount of Cr causes precipitation of an excessive amount of Cr-based carbonitrides and this degrades resistance to hydrogen embrittlement. Therefore, it is necessary to set the upper limit of the amount of Cr to be 25.0%. The amount of Cr is preferably 22.5% or less.

<Mo: 3.5% or Less>

Mo is an element contributing to an increase in strength of the austenitic stainless steel and enhancement of the corrosion resistance. However, an addition of Mo causes an increase in the alloy cost. Therefore, the amount of Mo is set to be 3.5% or less. Meanwhile, Mo is an element which is unavoidably mixed in from a scrap material. An extreme reduction in the amount of Mo causes restriction of a dissolution material and this leads to an increase in manufacturing cost. Therefore, in order to obtain the aforementioned effect and manufacturability, it is preferable to set the lower limit of the amount of Mo to be 0.05%.

<Cu: 3.5% or Less>

Cu is an element effective for stabilizing the austenite phase. Since stabilization of the austenite phase enhances resistance to hydrogen embrittlement, the amount of Cu is preferably 0.15% or more. Meanwhile, Cu contributes to an increase in strength due to precipitation strengthening due to Cu; however, an excessive amount of Cu leads to a decrease in strength of the austenite phase and also impairs hot workability. Therefore, it is necessary to set the upper limit of the amount of Cu to be 3.5%. The amount of Cu is more preferably 3.0% or less.

<N: 0.01% to 0.50%>

N is an element effective for stabilizing an austenite phase and enhancing corrosion resistance. In addition, N also contributes to an increase in strength due to solid solution strengthening and precipitation strengthening due to Cr-based nitrides. In order to obtain these effects, the amount of N is set to be 0.01% or more. The amount of N is preferably 0.04% or more. Meanwhile, an excessive amount of N promotes generation of an excessive amount of Cr-based nitrides, and this degrades resistance to hydrogen embrittlement of the austenite phase, corrosion resistance, and toughness. Therefore, it is necessary to set the upper limit of the amount of N to be 0.50%. The amount of N is more preferably 0.35% or less.

<O: 0.015% or Less>

O forms oxides in the steel; and thereby, O degrades hot workability and toughness of the austenite phase. Therefore, it is necessary to limit the upper limit of the amount of O (oxygen) to be 0.015% or less. The amount of O is preferably 0.010% or less. It is preferable to reduce the amount of O (oxygen) as much as possible, but an extreme reduction in the amount thereof leads to an increase in the production cost of the steel. Therefore, the amount of O (oxygen) is preferably 0.001% or more.

The austenitic stainless steel according to the embodiment includes Fe and unavoidable impurities in addition to the elements which have been described above. However, the austenitic stainless steel may contain optionally added elements which are described below.

<Al: 0.3% or Less, Mg and Ca: 0.01% or Less, REM: 0.10% or Less, and B: 0.008% or Less>

Al, Mg, Ca, REM, and B are elements effective for deoxidization and enhancement of hot workability and corrosion resistance. If necessary, one or more elements selected from these may be added. However, excessive amounts of these elements cause a remarkable increase in the manufacturing cost. Therefore, it is necessary to set the upper limits of the amounts of these elements to be Al: 0.3% or less, Mg and Ca: 0.01% or less, REM: 0.10% or less, and B: 0.008% or less. It is not necessary to provide the lower limits of the amounts of these elements in particular; however, in order to sufficiently obtain the deoxidization effect, it is preferable to set the lower limits to be Al: 0.01%, Mg and Ca: 0.0002%, REM: 0.001%, and B: 0.0002%. Here, REM (rare earth element) refers to a generic term for 2 elements of scandium (Sc) and yttrium (Y), and 15 elements (lanthanoid) from lanthanum (La) to lutetium (Lu) according to the general definition. A single element may be added or two or more elements may be added. The amount of REM is the total amount of these elements.

<Ti, Nb, and V: 0.50% or Less>

Ti, Nb, and V are solid-solubilized in the steel or precipitated as carbonitrides; and thereby, the strength is increased. Therefore, Ti, Nb, and V are elements effective for increasing the strength. One or more elements selected from these may be added as necessary. In this case, each of the amounts of Ti, Nb, and V is preferably 0.01% or more. However, in the case where each of the amounts of Ti, Nb, and V is increased to more than 0.50%, generation of Cr-based carbonitrides is suppressed, and it is not possible to sufficiently obtain the effect of precipitation strengthening due to the Cr-based carbonitrides. Therefore, it is necessary to set the upper limit of each of the amounts of Ti, Nb, and V to be 0.50% or less. The upper limit of each of the amounts of Ti, Nb, and V is preferably 0.40%.

Other elements excluding the elements described above can be included within the range not impairing the effects of the embodiment.

"Reasons for the Limitation Regarding Precipitates"

Next, the size and the generation amount of the precipitates in the steel will be described.

In the specimen where hydrogen embrittlement has occurred, cracks are generated in the surroundings of Cr-based carbonitrides or intermetallic compounds of Ni, Fe, Cr, Mo, and Si. This is because resistance to hydrogen gas embrittlement is locally degraded in the surroundings of each precipitate, which is caused by the Cr-depletion layer formed in the surroundings of each precipitate. The cracks generated from the surroundings of the precipitates as starting points are linked to each other and propagated. Thus ductility is decreased.

However, by controlling the average size of the precipitates to be 100 nm or less and controlling the generation amount of the precipitates to be 1.0% or less in terms of mass %, generation and development of the cracks generated by hydrogen gas embrittlement are remarkably suppressed. As a result, the resistance to hydrogen gas embrittlement is enhanced.

Further, in the case where the strength is increased by precipitation strengthening due to the precipitates and solid solution strengthening due to N is acted and combined therewith, it is possible to obtain a tensile strength of about 650 MPa, which is equal to or higher than that of the cold-worked material of SUS316 steel. In order to obtain these effects, the lower limit of the generation amount of the precipitates is set to be 0.001% or more. The lower limit of the generation amount of the precipitates is preferably 0.005% or more.

The average size of the precipitates and the generation amount of the precipitates can be controlled by controlling the average cooling rate after the final heat treatment described below. The lower this average cooling rate is, the more the precipitates are coarsened. Therefore, the presence of the precipitates can be confirmed by a Transmission Electron Microscope (TEM). The average size of the precipitates is preferably 70 nm or less.

Meanwhile, in the case where the average cooling rate is high (the case where the average cooling rate is close to the upper limit), the precipitates are very fine. Therefore, the lower limit of the average size of the precipitates is not particularly provided, but is preferably 5 nm or more.

The generation amount of carbonitrides and intermetallic compounds (precipitates) can be measured by, for example, an electroextraction residual method.

In the case where an excessive amount of the precipitates are produced, linking and propagation of the cracks generated from the surroundings of the precipitates as starting points are promoted. Therefore, it is necessary to set the generation amount of the precipitates to be 1.0% or less in terms of mass %. The generation amount of the precipitates is preferably 0.90% or less in terms of mass %. Meanwhile, in the case where the cooling rate is high (the case where the cooling rate is close to the upper limit), the precipitates are very fine. Therefore, the lower limit of the average size of the precipitates is not particularly provided. However, in order to obtain the effect of increasing the strength due to Cr-based carbonitrides and intermetallic compounds of Ni, Fe, Cr, Mo, and Si, the generation amount is preferably 0.02% or more in terms of mass %.

In addition, the average size of the precipitates is measured by, for example, the following method. The precipitates are observed by TEM, the precipitates are identified by EDX, and the precipitates are specified. Next, the major axis and the minor axis of one precipitate are measured by a TEM photograph. Then, the average value of the major axis and the minor axis ((major axis+minor axis)/2) is calculated, and the average value is utilized as the size of the precipitate. In the same manner, the sizes of a plurality of precipitates are obtained. The average value of the sizes of the plurality of precipitates is calculated, and the average value thereof can be utilized as the average size of the precipitates in the stainless steel. In addition, in the embodiment, a rectangle circumscribing one precipitate is drawn such that the area thereof becomes the smallest. Then, the long side of this circumscribing rectangle is utilized as a major axis of the precipitate and the short side of this circumscribing rectangle is utilized as a minor axis of the precipitate.

In addition, the "precipitate" in the invention means all the precipitates precipitated in the steel and includes Ti-, Nb-, and V-based carbonitrides, precipitated Cu, and the like in addition to Cr-based carbonitrides and intermetallic compounds of Ni, Fe, Cr, Mo, and Si.

"Manufacturing Method"

Next, one example of the method for manufacturing an austenitic stainless steel according to the embodiment will be described.

For manufacturing the austenitic stainless steel of the embodiment, at first, a stainless steel having the aforementioned component composition is melted to manufacture a semi-finished product such as a slab or the like. Next, the semi-finished product is heated at a predetermined temperature, and the semi-finished product is subjected to hot working such as hot rolling, or the like (a step of hot working).

The austenitic stainless steel of the embodiment is not limited to a steel sheet. Therefore, the semi-finished product is not limited to a slab, and it is needless to say that the austenitic stainless steel of the embodiment can be achieved by selecting a preferable shape of the semi-finished product (billet, bloom, or the like) in accordance with the shape of the target product (bar, pipe, or the like).

Hereinafter, conditions of the final heat treatment after the hot working will be described in detail.

If the temperature of the final heat treatment after the hot working is too high, the case may occur in which the strength of the steel material is decreased due to excessive growth of grains. In addition, the case may occur in which a grinding step is required to be further conducted because of the occurrence of abnormal oxidation, and this causes an increase in the production cost. Therefore, the upper limit of the temperature of the final heat treatment is set to be 1200° C. Meanwhile, if the temperature of the final heat treatment is too low, a deformation structure formed in the hot working remains and ductility of a steel product is decreased. Therefore, the lower limit is set to be 1000° C. The temperature range of the final heat treatment is preferably 1050° C. to 1180° C.

The retention time (holding time) of the heat treatment in the aforementioned temperature range is set to be 1 second to 1 hour. If the retention time is shorter than the range, a worked structure remains in the steel, and this causes a decrease in ductility. The lower limit of the retention time is preferably 30 seconds. In addition, if the retention time of the heat treatment is too long, the case may occur in which the strength is decreased due to excessive growth of grains. In addition, the case may occur in which a grinding step is required to be further conducted because of the occurrence of abnormal oxidation, and this causes an increase in the production cost. Therefore, the upper limit of the retention time is set to be 40 minutes.

The precipitation nose temperature of Cr-based carbonitrides and intermetallic compounds of Ni, Fe, Cr, Mo, and Si is about 800° C. In the case where the steel material is retained at a temperature of higher than this temperature, the precipitates are rapidly coarsened. Thus, it is difficult to control the average size of the precipitates to be 100 nm or less. Meanwhile, in the case where the steel material is retained at a temperature of 800° C. or lower, the coarsening of the precipitates can be suppressed but it takes time to start the precipitation. Therefore, this leads to an increase in the manufacturing cost.

However, by controlling the average cooling rate to be less than 2.0° C./s until a temperature reaches 750° C. after the final heat treatment at a temperature of 1000° C. to 1200° C., it is possible to secure the average size and the generation amount of the precipitates which attain both of the increase in strength of the stainless steel and the enhancement of resistance to hydrogen embrittlement.

From the above-described matters, in the cooling step after the final heat treatment, it is necessary to control the average cooling rate to be less than 2.0° C./s until a temperature reaches 750° C. In the case where the average cooling rate is higher than 2.0° C./s, the time for which the precipitates are precipitated cannot be secured. Thus, it is not possible to increase the strength of the steel product. Meanwhile, in the case where the cooling rate is excessively low, the average size of the precipitates may be more than 100 nm and satisfactory resistance to hydrogen embrittlement of the steel product may not be secured. Therefore, the lower limit of the average cooling rate is preferably 0.3° C./s or higher. The lower limit is more preferably 0.4° C./s or higher.

In addition, after the aforementioned hot working and final heat treatment are performed, acid washing or cold working may be conducted as necessary.

In addition, the method for manufacturing the austenitic stainless steel according to the embodiment is not limited to the manufacturing method described above, and any manufacturing method may be adopted, if the method is a method by which the average size and the generation amount of the precipitates can be controlled within the aforementioned ranges.

In addition, the average size and the generation amount of the precipitates may be controlled within the aforementioned ranges by a heat treatment in a step of manufacturing a hydrogen equipment (application) in which the austenitic stainless steel including the components within the ranges of the invention is used, or a heat treatment to which the hydrogen equipment (application) is subjected.

EXAMPLES

Examples of the invention will be described in detail, but the invention is not limited to conditions used in the following Examples.

In addition, the underlined values in Tables indicate that they are out of the ranges of the embodiment.

A stainless steel test material having a component composition shown in Table 1 was melted, and a semi-finished product having a thickness of 120 mm was manufactured. Next, the semi-finished product was heated at a temperature of 1200° C., and then the semi-finished product was subjected to hot forging and hot rolling to obtain a hot-rolled sheet having a thickness of 20 mm. Next, the hot-rolled sheet was subjected to a final heat treatment and cooling under conditions shown in Table 2 to obtain a hot-rolled and annealed sheet. The retention time for the final heat treatment was 3 minutes to 20 minutes. The "heat treatment temperature (° C.)" in Table 2 indicates the temperature of the final heat treatment, and the "cooling rate (° C./s)" indicates the average cooling rate until the temperature reached 750° C.

The average size of the precipitates and the amount of the precipitates of each test material are shown in Table 2.

A sample was formed from the obtained hot-rolled and annealed sheet by an extraction replica method, and then the precipitates were observed by a TEM. The size of one precipitate was determined as the average value of the major axis and the minor axis ((major axis+minor axis)/2). The sizes of 30 precipitates were measured, and the average value of the sizes of the 30 precipitates was determined to be the average size of the precipitates in the test material.

An analysis sample was collected from the test material in the same manner, and the amount of the precipitates was measured according to the electroextraction residual method. A filter having a mesh size of 0.2 μm was used as the filter for filtering out a residue.

Next, with regard to each hot-rolled and annealed sheet of the test material, the resistance to hydrogen gas embrittlement was evaluated according to the method shown below.

A round bar tensile specimen which included a parallel part having an outer diameter of 3 mm and a length of 20 mm was collected from a longitudinal direction of the hot-rolled and annealed sheet having a thickness of 20 mm and a central part of the sheet thickness. (1) A tensile test in the atmosphere and (2) a tensile test in the high-pressure hydrogen gas were performed using this round bar tensile specimen.

The tensile test (1) in the atmosphere was conducted under conditions in which the test temperatures were 25° C. and −40° C. and the strain rate was $5 \times 10^{-5}$/s. A specimen of which the tensile strength measured by the tensile test at 25° C. was higher than 650 MPa was evaluated as "Pass" (acceptable quality).

The tensile test (2) in the high-pressure hydrogen gas was conducted under conditions in which the test temperature was −40° C., the test environment was a hydrogen gas of 70 MPa, and the strain rate was $5 \times 10^{-5}$/s. The specimen Nos. A3, A4, and A6 were also subjected to the tensile test under conditions in which the test environment was a hydrogen gas of 103 MPa in the same manner as described above except for test environment.

Then, the value (relative reduction of area) of "(reduction of the area in the high-pressure hydrogen gas/reduction of the area in the atmosphere)×100(%)" at −40° C. was calculated. A test material having the value of 80% or more was evaluated such that the resistance to hydrogen embrittlement in the high-pressure hydrogen gas was "Pass" (acceptable quality). In particular, a specimen in which the tensile strength at 25° C. was higher than 650 MPa and the reduction of area was 80% or more and less than 85% was evaluated as "0", and a specimen in which the tensile strength at 25° C. was higher than 650 MPa and the reduction of area was 85% or more was evaluated as "@".

The results are shown in Table 3 and Table 4.

The specimens A1a, A1c, and A2 to A18 are test materials (Invention Examples) which were subjected to the final heat treatment and the cooling under preferable conditions.

With regard to these specimens, the tensile strengths at 25° C. in the atmosphere were 650 MPa or higher, while the relative reduction of area values (the values of the relative reduction of area) were 80% or more. In particular, with regard to the specimens A1a, A2 to A6, and A8 to A17 in which the amounts of Ni and Cu having great influences on enhancing the resistance to hydrogen embrittlement and the average cooling rate were within the preferable ranges of the embodiment, the relative reduction of area values were 85% or more, and the resistances to hydrogen embrittlement were excellent.

In addition, the specimens A3, A4, and A6 were also subjected to the tensile test in the hydrogen gas of 103 MPa, and the relative reductions of area were 90% or more which were more than the target value of 80%.

With regard to the specimen A1b, the cooling rate after the final heat treatment was out of the range of the invention. As a result, the precipitates were not precipitated in the test material during the cooling after the final heat treatment and the effect of precipitation strengthening could not be obtained. Thus, the tensile strength in the atmosphere at room temperature was lower than 650 MPa.

With regard to the specimen B1, the amount of Ni was less than the range of the invention. As a result, the resistance to hydrogen embrittlement was insufficient and the relative reduction of area value was 59%.

With regard to the specimen B2, the amount of Cu was more than the range of the invention. As a result, the strength of the austenite phase was decreased and the tensile strength at 25° C. in the atmosphere was lower than the target value of 650 MPa.

With regard to the specimen B3, the amount of Si was more than the range of the invention. As a result, the resistance to hydrogen embrittlement was insufficient and the relative reduction of area value was 68.8%.

With regard to the specimen B4, the amount of Cr was more than the range of the invention. As a result, the precipitates were precipitated at an amount of more than the range of the invention. Consequently, the hydrogen gas embrittlement sensitivity was increased, the resistance to hydrogen embrittlement was insufficient, and the relative reduction of area value was 61.5%.

With regard to the specimen B5, the amount of Mn was more than the range of the invention. As a result, the resistance to hydrogen embrittlement was insufficient and the relative reduction of area value was 71.3%.

With regard to the specimen B6, the amount of Cr was less than the range of the invention. As a result, the stability of the austenite phase was decreased; and thereby, the resistance to hydrogen embrittlement was insufficient and the relative reduction of area value was 77.5%.

With regard to the specimen B7, the amount of N was less than the range of the invention. As a result, the strength of the austenite phase was decreased and the tensile strength at 25° C. in the atmosphere was lower than the target value of 650 MPa.

TABLE 1

| Steel No. | Component Composition (mass %) | | | | | | | | | | | | Remarks |
|---|---|---|---|---|---|---|---|---|---|---|---|---|---|
| | C | Si | Mn | P | S | Ni | Cr | Mo | Cu | N | O | Others | |
| A1 | 0.09 | 0.49 | 0.66 | 0.037 | 0.005 | 12.9 | 18.4 | 2.2 | 0.22 | 0.22 | 0.009 | | Invention steel |
| A2 | 0.08 | 0.49 | 0.81 | 0.030 | 0.004 | 12.8 | 18.4 | 2.2 | 0.31 | 0.13 | 0.008 | | |
| A3 | 0.15 | 0.48 | 0.79 | 0.034 | 0.004 | 13.1 | 17.9 | 2.1 | 0.25 | 0.26 | 0.009 | | |
| A4 | 0.10 | 0.50 | 0.93 | 0.036 | 0.005 | 14.4 | 18.8 | 2.2 | 0.22 | 0.23 | 0.011 | | |
| A5 | 0.11 | 1.11 | 0.50 | 0.036 | 0.004 | 15.0 | 19.0 | 2.4 | 0.23 | 0.23 | 0.007 | | |
| A6 | 0.06 | 0.49 | 2.10 | 0.035 | 0.003 | 18.3 | 23.8 | 1.9 | 1.52 | 0.44 | 0.009 | | |
| A7 | 0.09 | 0.51 | 0.64 | 0.037 | 0.003 | 10.9 | 19.1 | 2.1 | 2.93 | 0.25 | 0.009 | | |
| A8 | 0.08 | 0.49 | 0.72 | 0.042 | 0.005 | 12.6 | 16.9 | 2.3 | 0.24 | 0.19 | 0.008 | | |
| A9 | 0.09 | 0.49 | 0.92 | 0.037 | 0.004 | 12.6 | 18.3 | 3.3 | 0.22 | 0.22 | 0.008 | | |
| A10 | 0.11 | 0.55 | 0.82 | 0.025 | 0.005 | 13.0 | 18.1 | 0.8 | 0.25 | 0.05 | 0.007 | Al: 0.067, Ca: 0.0031, B: 0.0019 | |
| A11 | 0.10 | 0.51 | 1.11 | 0.034 | 0.004 | 12.9 | 18.0 | 1.8 | 0.29 | 0.22 | 0.009 | Mg: 0.0042, Ca: 0.0021 | |
| A12 | 0.11 | 0.49 | 1.14 | 0.033 | 0.005 | 12.8 | 18.4 | 1.9 | 0.22 | 0.24 | 0.009 | REM: 0.008 | |
| A13 | 0.09 | 0.51 | 0.87 | 0.037 | 0.005 | 13.0 | 18.1 | 2.0 | 0.23 | 0.21 | 0.007 | Ti: 0.12, Nb: 0.09, V: 0.11 | |
| A14 | 0.09 | 0.49 | 0.96 | 0.031 | 0.004 | 12.9 | 17.8 | 2.0 | 0.23 | 0.28 | 0.007 | Ti: 0.21 | |
| A15 | 0.14 | 0.32 | 0.68 | 0.033 | 0.003 | 13.1 | 17.6 | 2.1 | 0.28 | 0.25 | 0.009 | Nb: 0.18 | |
| A16 | 0.10 | 0.51 | 0.82 | 0.033 | 0.005 | 13.0 | 18.0 | 2.4 | 0.20 | 0.25 | 0.012 | V: 0.22 | |
| A17 | 0.06 | 0.40 | 1.09 | 0.016 | 0.003 | 14.1 | 18.7 | 2.2 | 0.23 | 0.39 | 0.008 | Al: 0.059, Ca: 0.0033, Ti: 0.14, Nb: 0.15 | |
| A18 | 0.03 | 0.41 | 1.0 | 0.031 | 0.004 | 12.3 | 17.8 | 1.7 | 0.09 | 0.13 | 0.004 | | |
| B1 | 0.11 | 0.45 | 0.65 | 0.037 | 0.004 | <u>8.5</u> | 18.1 | 1.9 | 0.22 | 0.23 | 0.009 | | Comparative steel |
| B2 | 0.12 | 0.49 | 0.65 | 0.039 | 0.005 | 12.5 | 18.0 | 1.9 | <u>4.11</u> | 0.25 | 0.006 | Al: 0.055, Ca: 0.0038, B: 0.0011 | |
| B3 | 0.10 | <u>3.10</u> | 0.6 | 0.034 | 0.005 | 12.6 | 18.7 | 2.0 | 0.21 | 0.24 | 0.009 | | |
| B4 | 0.09 | 0.50 | 0.61 | 0.029 | 0.005 | 13.1 | <u>27.4</u> | 1.9 | 0.24 | 0.31 | 0.009 | | |
| B5 | 0.12 | 0.49 | <u>3.2</u> | 0.051 | 0.004 | 12.9 | 18.2 | 2.1 | 0.28 | <u>0.63</u> | 0.010 | | |
| B6 | 0.11 | 0.44 | 0.87 | 0.035 | 0.003 | 12.0 | <u>14.2</u> | 1.8 | 0.29 | 0.14 | 0.009 | | |
| B7 | 0.01 | 0.49 | 0.81 | 0.032 | 0.004 | 12.5 | 17.6 | 2.4 | 0.22 | <u>0.008</u> | 0.006 | Ti: 0.10, Nb: 0.08, V: 0.08 | |

TABLE 2

| Specimen No. | | Heat treatment temperature (° C.) | Cooling rate (° C./s) | Size of precipitates (nm) | Amount of precipitates (mass %) | Remarks |
|---|---|---|---|---|---|---|
| A1 | A1a | 1080 | 1.5 | 15 | 0.170 | Invention Example |
| | A1b | 1080 | <u>7.0</u> | Precipitates were not detected | | Comparative Example |
| | A1c | 1080 | 0.3 | 85 | 0.205 | Invention Example |
| A2 | | 1080 | 1.5 | 10 | 0.023 | Example |
| A3 | | 1080 | 1.5 | 15 | 0.217 | |
| A4 | | 1100 | 1.5 | 20 | 0.470 | |
| A5 | | 1100 | 1.5 | 20 | 0.122 | |
| A6 | | 1080 | 1.8 | 30 | 0.571 | |
| A7 | | 1080 | 1.8 | 30 | 0.142 | |
| A8 | | 1150 | 1.5 | 20 | 0.277 | |
| A9 | | 1150 | 1.5 | 20 | 0.660 | |
| A10 | | 1150 | 1.5 | 20 | 0.131 | |
| A11 | | 1080 | 1.5 | 20 | 0.188 | |
| A12 | | 1080 | 1.5 | 15 | 0.158 | |
| A13 | | 1080 | 1.5 | 20 | 0.113 | |
| A14 | | 1100 | 1.8 | 25 | 0.136 | |
| A15 | | 1100 | 1.8 | 25 | 0.141 | |
| A16 | | 1100 | 1.8 | 20 | 0.151 | |
| A17 | | 1100 | 1.8 | 35 | 0.440 | |
| A18 | | 1100 | 1.8 | 20 | 0.143 | |
| B1 | | 1080 | 1.8 | 20 | 0.177 | Comparative Example |
| B2 | | 1080 | 1.8 | 30 | 0.258 | |
| B3 | | 1100 | 1.5 | 30 | 0.336 | |
| B4 | | 1100 | 1.5 | 20 | 1.328 | |
| B5 | | 1100 | 1.5 | 25 | 1.584 | |
| B6 | | 1080 | 1.5 | 20 | 0.110 | |
| B7 | | 1080 | 1.8 | 15 | 0.020 | |

TABLE 3

| Specimen No. | | Tensile strength 25° C. (MPa) | Reduction of area, −40° C. | | Relative reduction of area (%) | Evaluation | Remarks |
|---|---|---|---|---|---|---|---|
| | | | Atmosphere (%) | Hydrogen of 70 MPa (%) | | | |
| A1 | A1a | 712 | 79 | 73 | 92.4 | @ | Invention Example |
| | A1b | 590 | 82 | 70 | 85.4 | x | Comparative Example |
| | A1c | 660 | 76 | 61 | 80.3 | o | Invention Example |
| A2 | | 681 | 84 | 81 | 96.4 | @ | |
| A3 | | 709 | 80 | 74 | 92.5 | @ | |
| A4 | | 776 | 74 | 77 | 104.1 | @ | |
| A5 | | 701 | 79 | 77 | 97.5 | @ | |
| A6 | | 710 | 84 | 86 | 102.4 | @ | |
| A7 | | 664 | 79 | 65 | 82.3 | o | |
| A8 | | 706 | 77 | 75 | 97.4 | @ | |
| A9 | | 729 | 80 | 72 | 90.0 | @ | |
| A10 | | 701 | 82 | 73 | 89.0 | @ | |
| A11 | | 707 | 79 | 76 | 96.2 | @ | |
| A12 | | 720 | 78 | 70 | 89.7 | @ | |
| A13 | | 703 | 75 | 68 | 90.7 | @ | |
| A14 | | 706 | 77 | 71 | 92.2 | @ | |
| A15 | | 721 | 81 | 75 | 92.6 | @ | |
| A16 | | 702 | 79 | 68 | 86.1 | @ | |
| A17 | | 711 | 78 | 77 | 98.7 | @ | |
| A18 | | 725 | 77 | 62 | 80.5 | o | |
| B1 | | 711 | 78 | 46 | 59.0 | x | Comparative Example |
| B2 | | 616 | 83 | 68 | 81.9 | x | |
| B3 | | 713 | 77 | 53 | 68.8 | x | |
| B4 | | 755 | 78 | 48 | 61.5 | x | |
| B5 | | 749 | 80 | 57 | 71.3 | x | |
| B6 | | 716 | 80 | 62 | 77.5 | x | |
| B7 | | 619 | 77 | 63 | 81.8 | x | |

TABLE 4

| Specimen No. | Atmosphere (%) | Hydrogen of 103 MPa (%) | Relative reduction of area (%) | Remarks |
|---|---|---|---|---|
| A3 | 81 | 79 | 97.5 | Invention Example |
| A4 | 77 | 73 | 94.8 | |
| A6 | 72 | 75 | 104.2 | |

Reduction of area, −40° C.

INDUSTRIAL APPLICABILITY

The austenitic stainless steel of the invention has extremely excellent resistance to hydrogen embrittlement in a high-pressure hydrogen gas having a pressure of higher than 40 MPa, and a tensile strength of higher than 650 MPa. Therefore, the austenitic stainless steel of the present invention can be applied as materials of a high-pressure hydrogen gas tank for storing a hydrogen gas having a pressure of higher than 40 MPa, a high-pressure hydrogen gas tank liner, a high-pressure hydrogen gas heat exchanger, and a piping for a high-pressure hydrogen gas and liquid hydrogen.

The invention claimed is:

1. An austenitic stainless steel having resistance to hydrogen embrittlement comprising, in terms of mass %:
C: 0.2% or less;
Si: 0.2% to 1.5%;
Mn: 0.5% to 2.5%;
P: 0.042% or less;
S: 0.008% or less;
Ni: 10.0% to 20.0%;
Cr: 16.0% to 19.1%;
Mo: 3.5% or less;
Cu: 1.52% or less;
N: 0.01% to 0.50%; and
O: 0.015% or less,
with a balance being Fe and unavoidable impurities,
wherein an average size of precipitates is 100 nm or less and an amount of the precipitates is 0.001% to 1.0% in terms of mass %.

2. The austenitic stainless steel having resistance to hydrogen embrittlement according to claim 1, further comprising one or more selected from the group consisting of, in terms of mass %,
Al: 0.3% or less,
Mg: 0.01% or less,
Ca: 0.01% or less,
REM: 0.10% or less, and
B: 0.008% or less.

3. The austenitic stainless steel having resistance to hydrogen embrittlement according to claim 1, further comprising one or more selected from the group consisting of, in terms of mass %,
Ti: 0.5% or less,
Nb: 0.5% or less, and
V: 0.5% or less.

4. The austenitic stainless steel having resistance to hydrogen embrittlement according to claim 1, which is used for a high-pressure hydrogen gas and liquid hydrogen environment.

5. A method for manufacturing the austenitic stainless steel having resistance to hydrogen embrittlement according to claim 1, the method comprising:
subjecting a semi-finished product having a component composition comprising, in terms of mass %:
C: 0.2% or less;
Si: 0.2% to 1.5%;
Mn: 0.5% to 2.5%;
P: 0.042% or less;
S: 0.008% or less;
Ni: 10.0% to 20.0%;
Cr: 16.0% to 19.1%;
Mo: 3.5% or less;
Cu: 1.52% or less;
N: 0.01% to 0.50%; and
O: 0.015% or less,
with a balance being Fe and unavoidable impurities, to hot working;
performing a final heat treatment at a temperature of 1000° C. to 1200° C.; and
performing cooling after the final heat treatment,
wherein, in the cooling, an average cooling rate until a temperature reaches 750° C. is controlled to be less than 2.0° C./s.

6. The austenitic stainless steel having resistance to hydrogen embrittlement according to claim 2, further comprising one or more selected from the group consisting of, in terms of mass %,
Ti: 0.5% or less,
Nb: 0.5% or less, and
V: 0.5% or less.

7. The austenitic stainless steel having resistance to hydrogen embrittlement according to claim 2, which is used for a high-pressure hydrogen gas and liquid hydrogen environment.

8. The austenitic stainless steel having resistance to hydrogen embrittlement according to claim 3, which is used for a high-pressure hydrogen gas and liquid hydrogen environment.

9. A method for manufacturing the austenitic stainless steel having resistance to hydrogen embrittlement according to claim 2, the method comprising:
subjecting a semi-finished product having a component composition comprising, in terms of mass %:
C: 0.2% or less;
Si: 0.2% to 1.5%;
Mn: 0.5% to 2.5%;
P: 0.042% or less;
S: 0.008% or less;
Ni: 10.0% to 20.0%;
Cr: 16.0% to 19.1%;
Mo: 3.5% or less;
Cu: 1.52% or less;
N: 0.01% to 0.50%;
O: 0.015% or less; and
one or more selected from the group consisting of, in terms of mass %,
Al: 0.3% or less,
Mg: 0.01% or less,
Ca: 0.01% or less,
REM: 0.10% or less, and
B: 0.008% or less;
with a balance being Fe and unavoidable impurities, to hot working;
performing a final heat treatment at a temperature of 1000° C. to 1200° C.; and
performing cooling after the final heat treatment,
wherein, in the cooling, an average cooling rate until a temperature reaches 750° C. is controlled to be less than 2.0° C./s.

10. A method for manufacturing the austenitic stainless steel having resistance to hydrogen embrittlement according to claim 3, the method comprising:
- subjecting a semi-finished product having a component composition comprising, in terms of mass %:
- C: 0.2% or less;
- Si: 0.2% to 1.5%;
- Mn: 0.5% to 2.5%;
- P: 0.042% or less;
- S: 0.008% or less;
- Ni: 10.0% to 20.0%;
- Cr: 16.0% to 19.1%;
- Mo: 3.5% or less;
- Cu: 1.52% or less;
- N: 0.01% to 0.50%;
- O: 0.015% or less; and
- one or more selected from the group consisting of, in terms of mass %,
- Ti: 0.5% or less,
- Nb: 0.5% or less, and
- V: 0.5% or less;
- with a balance being Fe and unavoidable impurities, to hot working;
- performing a final heat treatment at a temperature of 1000° C. to 1200° C.; and
- performing cooling after the final heat treatment,
- wherein, in the cooling, an average cooling rate until a temperature reaches 750° C. is controlled to be less than 2.0° C./s.

* * * * *